United States Patent
Ives et al.

(10) Patent No.: US 9,087,331 B2
(45) Date of Patent: Jul. 21, 2015

(54) CONTEXTUAL ADVERTISING FOR VIDEO AND AUDIO MEDIA

(75) Inventors: David J. Ives, Southport, CT (US); David B. Seltzer, Westport, CT (US)

(73) Assignee: TVEyes Inc., Fairfield, CT (US)

( * ) Notice: Subject to any disclaimer, the term of this patent is extended or adjusted under 35 U.S.C. 154(b) by 1851 days.

(21) Appl. No.: 12/201,837

(22) Filed: Aug. 29, 2008

(65) Prior Publication Data
US 2009/0063279 A1 Mar. 5, 2009

Related U.S. Application Data

(60) Provisional application No. 60/968,725, filed on Aug. 29, 2007.

(51) Int. Cl.
*G06Q 30/00* (2012.01)
*G06Q 30/02* (2012.01)

(52) U.S. Cl.
CPC ............ *G06Q 30/00* (2013.01); *G06Q 30/0277* (2013.01)

(58) Field of Classification Search
CPC ........................ G06Q 30/00; G06Q 30/0277
USPC ............ 705/14.73, 10, 14.55, 14.66; 707/754
See application file for complete search history.

(56) References Cited

U.S. PATENT DOCUMENTS

| | | | | |
|---|---|---|---|---|
| 5,832,432 A * | 11/1998 | Trader et al. | | 704/260 |
| 6,345,252 B1 | 2/2002 | Beigi et al. | | |
| 6,397,228 B1 * | 5/2002 | Lamburt et al. | | 707/692 |
| 6,505,153 B1 | 1/2003 | Van Thong et al. | | |
| 6,519,571 B1 * | 2/2003 | Guheen et al. | | 705/14.66 |
| 6,718,551 B1 * | 4/2004 | Swix et al. | | 725/32 |
| 6,741,655 B1 | 5/2004 | Chang et al. | | |
| 6,970,602 B1 * | 11/2005 | Smith et al. | | 382/232 |
| 7,136,875 B2 * | 11/2006 | Anderson et al. | | 1/1 |
| 7,546,257 B2 * | 6/2009 | Hoffman et al. | | 705/28 |
| 7,818,319 B2 * | 10/2010 | Henkin et al. | | 707/726 |
| 7,827,174 B2 * | 11/2010 | Henkin et al. | | 707/726 |
| 7,831,433 B1 * | 11/2010 | Belvin et al. | | 704/275 |
| 7,844,215 B2 * | 11/2010 | Vance et al. | | 455/3.06 |
| 7,937,724 B2 * | 5/2011 | Clark et al. | | 725/35 |

(Continued)

FOREIGN PATENT DOCUMENTS

WO 0150296 A2 7/2001

OTHER PUBLICATIONS

DialogSrch15may2012; Examiner Dialog search May 15, 2012.*

*Primary Examiner* — John G Weiss
*Assistant Examiner* — Adam Chornesky
(74) *Attorney, Agent, or Firm* — St. Onge Steward Johnston & Reens LLC

(57) ABSTRACT

A system and method for serving contextually relevant advertisements is provided, including monitoring a media stream to indentify an audio or video asset, extracting and storing corresponding text from the asset, retrieving stored text when the asset is selected by a user, analyzing the text and identifying relevant advertisements that are then displayed to a user as a clickable text next to the playing video or audio asset. In further embodiments, the method may include the steps of retrieving a variable length portion of the text corresponding to the portion of the asset being played by the user, analyzing the portion of the text to identify advertisements relevant to the corresponding portion of the asset, displaying the advertisements during the playback of the portion of the asset, and then repeating the steps until the playback of the whole asset is completed.

30 Claims, 2 Drawing Sheets

(56) References Cited

U.S. PATENT DOCUMENTS

| | | | |
|---|---|---|---|
| 2002/0101392 A1* | 8/2002 | Hughes et al. | 345/1.1 |
| 2002/0178232 A1* | 11/2002 | Ferguson | 709/217 |
| 2004/0044570 A1* | 3/2004 | Aoyama | 705/14 |
| 2004/0059708 A1 | 3/2004 | Dean et al. | |
| 2004/0143844 A1 | 7/2004 | Brant et al. | |
| 2005/0209859 A1 | 9/2005 | Tenembaum et al. | |
| 2007/0033531 A1* | 2/2007 | Marsh | 715/738 |
| 2007/0078708 A1 | 4/2007 | Yu et al. | |
| 2007/0118873 A1 | 5/2007 | Houh et al. | |
| 2007/0203942 A1* | 8/2007 | Hua et al. | 707/104.1 |
| 2007/0204310 A1* | 8/2007 | Hua et al. | 725/88 |
| 2007/0276733 A1* | 11/2007 | Geshwind et al. | 705/14 |
| 2008/0066097 A1* | 3/2008 | Park et al. | 725/32 |
| 2008/0276266 A1* | 11/2008 | Huchital et al. | 725/32 |
| 2008/0281697 A1* | 11/2008 | Whitehead | 705/14 |
| 2009/0027495 A1* | 1/2009 | Oskin et al. | 348/143 |
| 2009/0063279 A1* | 3/2009 | Ives et al. | 705/14 |
| 2010/0138012 A1* | 6/2010 | Rhoads | 700/94 |
| 2010/0274673 A1* | 10/2010 | Isaac | 705/14.73 |

* cited by examiner

CONTEXTUAL ADVERTISING FOR VIDEO AND AUDIO MEDIA

CROSS-REFERENCE TO RELATED APPLICATIONS

This application claims priority benefit of the U.S. Provisional application No. 60/968,725, filed on Aug. 29, 2007.

FIELD OF THE INVENTION

The present invention relates generally to online advertising and more particularly to a method and system for serving advertisements that are contextually relevant to a particular audio or video media broadcast.

BACKGROUND OF THE INVENTION

The advent of the Internet in recent years has resulted in exponentially increased use of this interactive media as a powerful advertising tool. Interactive advertising provides opportunities for advertisers to target their ads to receptive audiences. Such targeted ads are more likely to be useful to end users since the ads may be relevant to a need inferred from a user's activity. For example, the ads may be chosen based on the user's search query or on a content of a document that the user requested.

So-called contextual advertising is advertising that it targeted to a specific content of media broadcast. A contextual advertising system scans the content for relevant information and returns ads based on such relevant information. One example of such system is a system that scans a text of a website for keywords and returns ads to the webpage based on the information that a user of the webpage is viewing. For example, if the user is viewing a webpage directed to travel destinations, the system will scan this content and display the ads relevant to travel, such as ads for airline tickets or hotels. Contextual advertising is also used by Internet search engines to display advertisings on "search result" pages that are relevant to words searched for by users of the search engines. For example, if some user types the search word "mortgage" into the search engine, the ads that are returned will be the ads that are reasonably expected to include the word "mortgage," such as ads for banks or other lending institutions.

Ad serving is a technology that places advertisements on web pages. Ad serving technology companies provide software to web sites and advertisers to serve ads, count them, choose the ads that will make the website or advertiser most money, and monitor progress of different advertising campaigns. An ad server is a computer server, specifically a web server, that stores advertisements used in online marketing and delivers them to website visitors. The content of the web server is constantly updated so that the website or webpage on which the ads are displayed contains new advertisements—e.g., banners (static images/animations) or text—when the site or page is visited or refreshed by a user.

Ad serving systems are known in the art. One of such systems is described in U.S. Patent Application No. 2004/0059708—to Dean et al., which is incorporated herein by reference. The ad serving system disclosed in Dean et al. obtains broadcast content from a requester, determines ads relevant to content and transmits relevant ads back to requester to be inserted into the broadcast.

Other ad serving systems search various audio or video files based on metadata associated with those files. Metadata refers to a descriptive searchable data hand entered to describe contents of an audio or video file. Thus, the results obtained from such search engines are limited to metadata information stored in a data repository. Such metadata information that describes an audio or video content is usually limited to information provided by the publisher of the content and consists of a brief summary of the content. If this limited information does not match the search query, the search engine will fail to associate relevant information with associated audio or video file even if the actual content of the file contain this information. An example of such system is disclosed in U.S. Patent Application No. 2007/0118873 A1 to Houh et al., which provides a method and system for generating and presenting search text snippets that enable user-directed navigation of the underlying audio-video content. The method involves obtaining metadata associated with discrete media content that satisfies a search query and creating a search "snippet" that enables a user to arbitrarily select and commence playback of the underlying media content at any of the individual content segments.

Yet another type of ad serving system is a system that searches video files based on some type of predetermined criteria and retrieves the portions of video files containing such criteria. For example, U.S. Pat. No. 6,741,655 to Chang et al. discloses a system and method for permitting a user to locate one or more video objects from a video clip over an interactive network. The system searches videos frames and retrieves specific pieces of video information which meet arbitrary predetermined criteria, such as shape or motion characteristics, of video objects embedded within the stored video information in response to a user-defined query.

However, the ad serving systems discussed above have several disadvantages. For example, such systems usually require a requester, such as a user or a search engine, to provide search words. The ad server system then uses the inputted words as keywords to determine relevant advertisings. Or a set of predetermined criteria must be provided to enable the ad serving system to match the video content with a relevant advertising.

Some of these problems were obviated by providing systems that incorporate voice recognition techniques to extract portions of underlying text from various video or audio files and then use this text to identify relevant ads to be displayed to an end-user. Such systems are disclosed, for example, in U.S. Patent Application No. 2007/0078708 A1 to Yu et al., U.S. Patent Application No. 2004/0143844 A1 to Brant et al., and WO 01/50296 A2 to Kopra et al. However, while some of these more recent systems do have advantages over older systems that did not use voice recognition techniques, they still suffer from many of the same disadvantages, as well as others.

What is desired, therefore, is to provide an improved system and method for providing contextually relevant advertisements to be served with any video or audio streams. It is further desired to provide a system and method that enables various audio or video websites to monetize their video content.

SUMMARY OF THE INVENTION

Accordingly, it is an object of the present invention to provide a system and method for extracting a corresponding text from a segment of video or audio file, analyzing the text and identifying relevant advertisements that are then displayed to a user as a clickable text next to the playing video or audio that overcomes the deficiencies of the prior art.

In order to achieve at least some of the objects listed above, a system for serving contextually relevant advertisements is provided, consisting of a computer system, a software executing on the computer system for continuously monitoring a stream of media to detect and retrieve a data asset from the stream, and a software executing on the computer system for transcribing the retrieved data asset to produce a transcription text. The transcription text is then stored in a transcript storage unit. The system further includes a software executing on the computer system for retrieving the transcription text from the transcript storage unit when the data asset is selected by a user, a software executing on the computer system for analyzing the transcription text and retrieving at least one advertisement item contextually relevant to the data asset, and a software executing on the computer system for forwarding the data asset to the user together with at least one retrieved advertisement item. The relevant advertisement item is displayed in proximity to the data asset and consists of a hyper text linked to a corresponding advertisement web page.

The stream of media may be a stream of media on the Internet. The data asset may be a video or an audio file.

The system may further include a metadata storage unit for storing metadata associated with the data asset. The metadata may then be retrieved when the data asset is selected by the user and used to select at least one advertisement item contextually relevant to the data asset.

The system may also consist of an advertisement storage unit for storing advertisement items received from at least one advertisement provider.

In another embodiment, a method for serving contextually relevant advertisements is provided, including the steps of continuously monitoring a stream of media to detect a data asset, retrieving the data asset from the stream when the data asset is detected, and transcribing the data asset to create a transcription text. The transcription text is then stored in a transcript storage unit for later retrieval. When the data asset is selected by a user, the transcription text is retrieved from the transcript storage and analyzed to identify at least one advertisement item contextually relevant to the data asset. Once such advertisement item is identified, it is delivered to the user together with the data asset and displayed in proximity to said data asset.

The data asset that is retrieved may be an audio or a video file.

The method may further include a step of using a voice recognition technique to create the transcription text. The voice recognition technique may comprise a step of creating a searchable index of every word contained in the data asset.

The method may also include a step of providing at least one advertisement item in form of a hyper text linked to a corresponding advertisement web page.

In yet another embodiment, a method for serving contextually relevant advertisements is provided, comprising the steps of continuously monitoring a stream of media to detect a data asset, retrieving the data asset from the stream, transcribing the data asset to create a transcription text, and storing the transcription text in a transcript storage unit for later retrieval. The method further includes the steps of retrieving a first portion of the transcription text having a variable length after a playback of a first corresponding portion of the data asset is initiated by a user, analyzing the first portion of the transcription text to identify at least one advertisement item contextually relevant to the first corresponding portion of the data asset, and displaying the advertisement item in proximity to the data asset until the playback of the first portion of the data asset is completed. Then, the above steps are repeated for other portions of the data asset until the playback of the data asset is completed.

The variable length of the data asset may be thirty seconds. The variable length of the data asset may further be fifteen seconds.

In yet further embodiment, a method for serving contextually relevant advertisements during live radio broadcast is provided, including the steps of retrieving a first portion of live radio broadcast, transcribing the first portion of live radio broadcast to create a first portion of transcription text, analyzing the first portion of transcription text to identify at least one advertisement item contextually relevant to the first portion of live radio broadcast, and displaying the advertisement item in proximity to live radio broadcast. The method further includes retrieving a second portion of live radio broadcast, transcribing the second portion of live radio broadcast to create a second portion of transcription text, analyzing the second portion of transcription text to identify at least one advertisement item contextually relevant to the second portion of live radio broadcast, and displaying the advertisement item in proximity to live radio broadcast. The above steps are then repeated until live radio broadcast is completed.

The method may also include delivering at least one contextually relevant advertisement item to a user after a playback of a corresponding portion of live radio broadcast is completed.

Other objects of the invention and its particular features and advantages will become more apparent from consideration of the following drawings and accompanying detailed description.

DETAILED DESCRIPTION OF THE INVENTION

Although the invention is described below with reference to Internet media, it should be understood that the invention equally applies to any type of broadcasting media, such as television, radio, Internet, podcasts, and the like.

Figure 1:
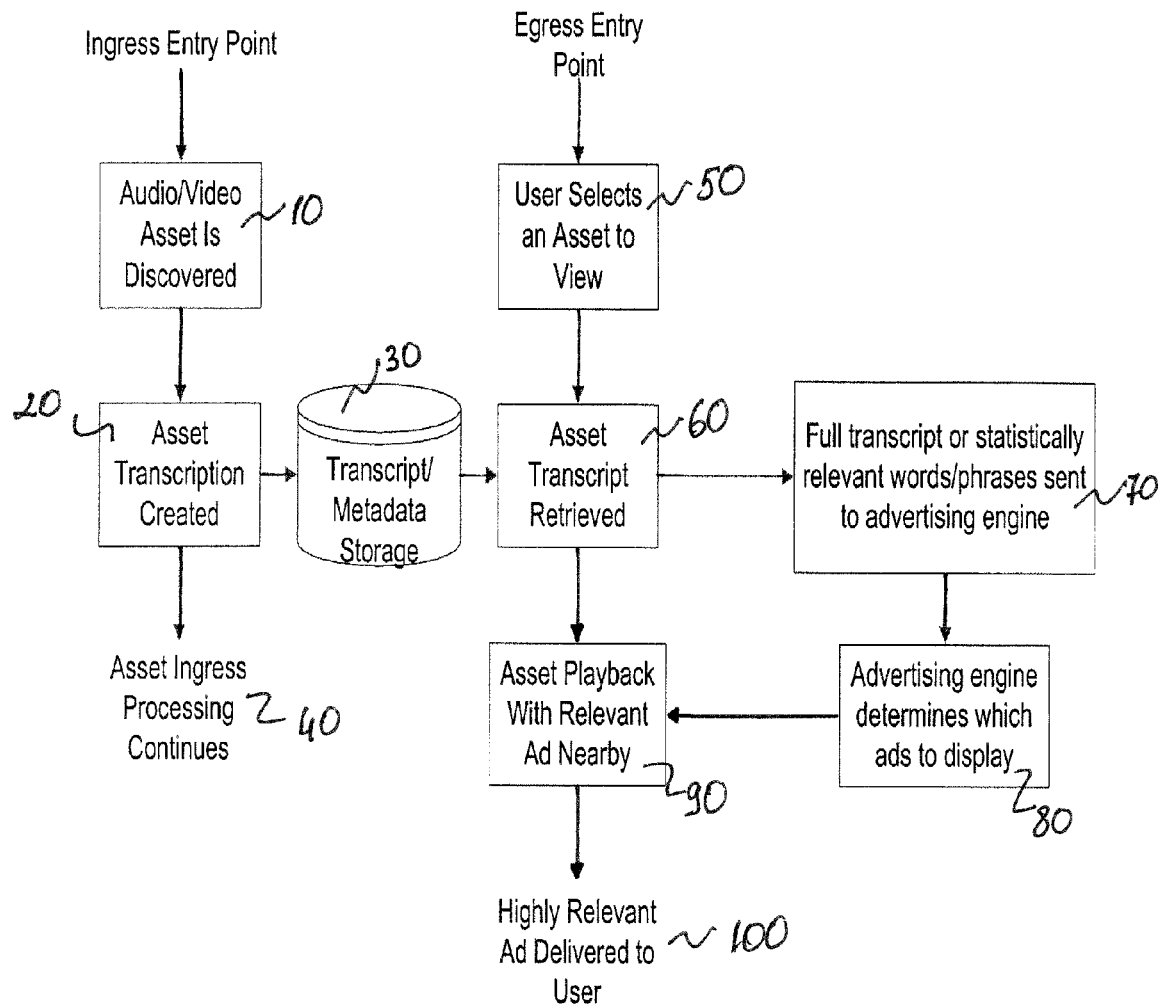
FIG. 1 is a schematic flow chart illustrating a method for serving contextually relevant advertisements in accordance with one embodiment of the present invention.

FIG. 1 is a schematic illustration of a method for serving contextually relevant advertisements in accordance with the present invention. First, a stream of media is inputted into the host server which uses a software program to detect 10 a particular data asset. Such data asset can be any audio or video file that is being streamed through the Internet. For example, audio or video websites such as YouTube may be monitored to identify audio or video clips that are available for users to play back.

The host server is equipped with voice recognition software. Once a data asset is detected, the voice recognition software is employed 20 to turn spoken words contained in the data asset into text. In the referred embodiment of the present invention, a voice recognition software is used that creates a time encoded 'spoken word index', which represent an exact transcript containing every spoken word in the data asset. This presents an advantage over other known ad serving systems because it does not require a search query or keywords to be provided by a user. Additionally, creating such 'spoken word index' also allows for more precise match between content of the video or audio file and relevant advertisements that are eventually provided to a user.

Once the data asset is transcribed by the voice recognition software, a transcribed text corresponding to the data asset is transmitted 30 to a transcript storage unit coupled to the host server. The transcribed text will be stored in the transcript storage unit until the user selects the data asset for playback which triggers the host server to retrieve the corresponding transcribed text from the storage unit. After the host server completes transcribing the data asset and transmitting the transcribed text to the storage unit, the stream of media is searched again 40 to identify next data asset. This allows for continuous monitoring of the media stream to retrieve data assets and to create corresponding transcription text for virtually every data asset available from the media stream for playback by the user.

When the user selects 50 a particular data asset for viewing on his/her personal computer, the host server is triggered to retrieve 60 a transcription text from the storage unit that corresponds to the data asset chosen for playback by the user. For example, when the user clicks on a particular video clip available on YouTube, the host server will access the storage unit and retrieve a transcription text that contains every spoken word in the video clip chosen by the user.

After the underlying text transcript is retrieved, the host computed utilizes a software program that analyzes 70 the text and matches 80 it to advertisements that are contextually relevant to the text. The full transcript of the data asset may be analyzed, or certain relevant words or phrases may be picked out first and then analyzed. The host server uses a software program that scans the 'spoken word index' of corresponding video or audio file created by the voice recognition software to determine a set of high-value keywords. If such keywords are detected in the 'spoken word index', the software then retrieves advertisements stored in an advertisement storage unit based on those keywords. Various databases may be employed for gathering and storing advertisement content in the advertisement storage unit. For example, the advertisement storage unit may contain a list of advertisements that are stored therein. It may also contain a corresponding list of keywords related to each stored advertisement. When the host server detects keywords in the transcribed text of the corresponding data asset, the software program then matched those keywords with the list of keywords stored in advertisement storage unit. When at least one match is found, the host server retrieves the advertisement containing relevant keywords.

One way to identify a keyword in the data asset is to analyze the 'spoken word index' to determine how many times certain words appear in the index. For example, if the video clip contains spoken words including the word "vacation" appearing twenty times and the word "travel" appearing ten times, the software program will identify these words as keywords for the data asset. The list of keywords related to content of each advertisement stored in the advertisement storage unit will then be scanned to determine whether the list contains the terms "travel" and "vacation." Once these terms are detected, the advertisements containing these terms will be selected and transmitted to the host server. The selected advertisements will include content reasonably related to the terms "vacation" and "travel," such as information on airline tickets, hotel reservations, or car rentals. U.S. Patent Application No. 2004/0059708 to Dean et al. discloses several other techniques that can be used to extract keywords from the data asset and is incorporated herein by reference.

Additionally, the host server may also extract metadata associated with a particular data asset. Metadata is a descriptive searchable data hand entered by a publisher of the audio or video file to describe contents of the file. Such retrieved metadata is then transmitted to a metadata storage unit, similar to transcript storage unit described above. When the user selects a video or audio file to view, the host server obtains the metadata associated with this file and uses it to extract relevant advertisement content.

It should be appreciated that instead of using the host server to analyze the content of the data asset and match is up with a contextually relevant advertisement from the advertisement storage unit, a commercially available ad serving engine may be employed instead. For example, Google AdSence or Yahoo! Publisher Network may be used. If such commercially available ad serving engine is used, the host server will send the transcript text, together with any associated metadata, to the ad server engine, and the ad serving engine then processes the information received from the host server to determine which ads to display, and transmits the relevant ads back to the host server to be displayed to the user together with corresponding data asset. Ad server engine may be a local ad server or a third-party or remote ad server. Local ad servers are typically run by a single publisher and serve ads to that publisher's domains, allowing fine-grained creative, formatting, and content control by that publisher. Remote ad servers can serve ads across domains owned by multiple publishers. They deliver the ads from one central source so that advertisers and publishers can track the distribution of their online advertisements, and have one location for controlling the rotation and distribution of their advertisements across the web.

After at least one contextually relevant advertisement item is retrieved from the advertisement storage unit, or is provided by the ad server engine, the host server then incorporates 90 the relevant advertisement into the data asset and transmits 100 the data asset, together with the advertisement, to the user for playback on the user's computer. It is understood that the host server may be connected to the client computer via the Internet, via a local area network or wide area network, or via intranet network. The contextually relevant advertisement may be provided in various formats, such as text or image banner. In the preferred embodiment of the present invention, the advertisement is provided as a hyper text file, which allows the user to click on the hyper text to be directed to the website being advertised. Such advertisement text is displayed in close proximity to the streaming video or audio window displayed on the user's computer. Preferably, the host server utilizes some type of communication protocol technology, such as Java script, that allows the hyper text of the relevant advertisement to be displayed together with the streaming data asset right after the corresponding transcription text is retrieved from the transcript storage data.

One of the advantages of the present invention is that the advertisements can be provided to the user simultaneously alongside the corresponding video or audio stream and thus are always highly relevant to the content of the video or audio stream. This allows the user to review the advertisements while watching the video clip, and if the user becomes interested in certain provided advertisements, he/she may click on the advertisement hypertext and visit the advertisement webpage of interest to the user.

Figure 2:
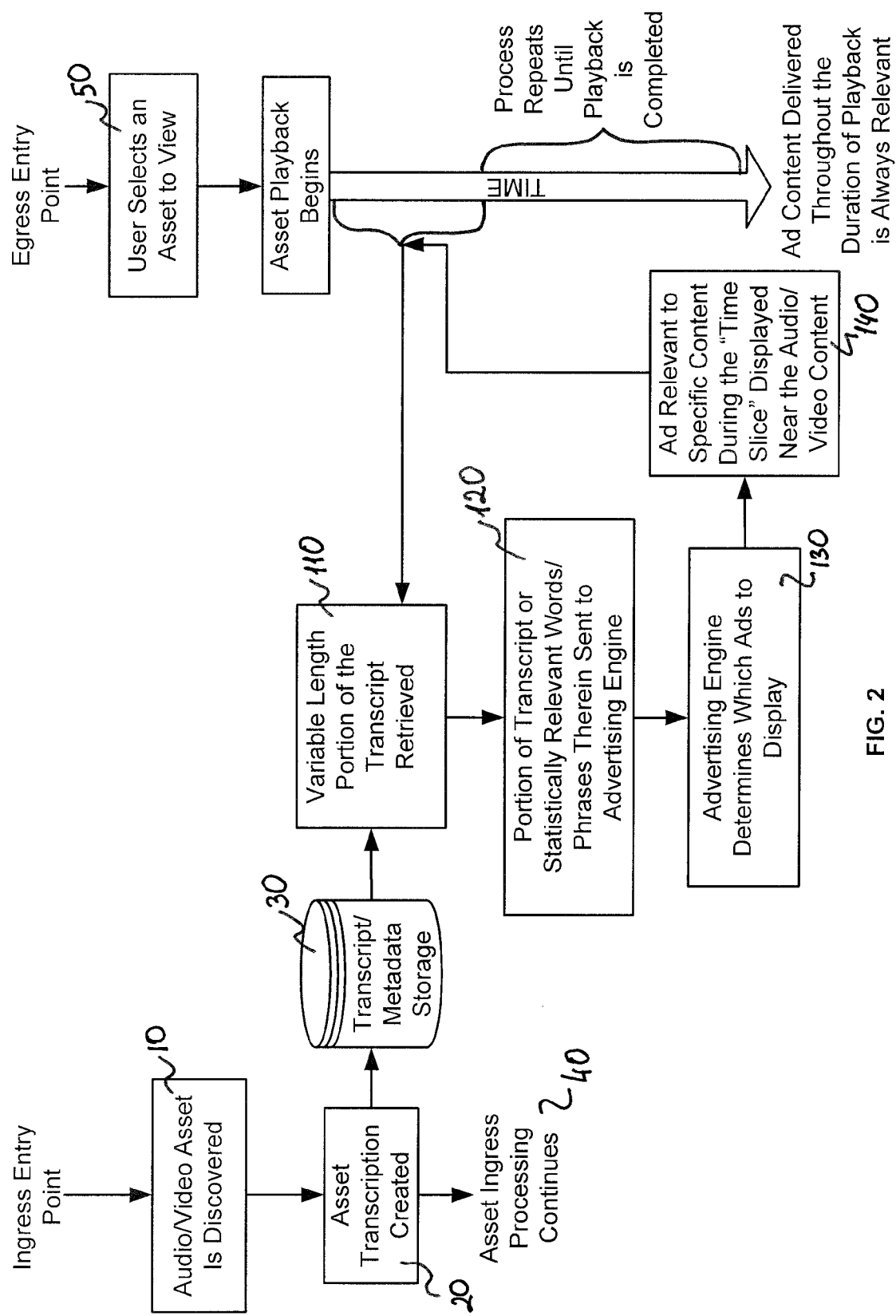
FIG. 2 is a schematic flow chart illustrating a method for serving contextually relevant advertisements in accordance with another embodiment of the present invention.

FIG. 2 illustrates a method for serving contextually relevant advertisements in accordance with another embodiment of the present invention. This method is directed to presenting relevant advertisements that are continuously updated as the corresponding audio or video file is streamed to the user's computer. The first four steps are same as the steps described above. The stream of media, such as a stream of media on the Internet, is monitored 10 by a host server to detect discrete data assets being streamed. Once such data asset is detected, it is retrieved from the stream of media by the host server. The host server then employs a voice recognition software program to create 20 a 'spoken word index' that represents a transcript of every spoken in the data asset. The transcript is transmitted 30 from the host server to a transcript storage unit, where it is stored for later retrieval. The host server then returns to monitoring 40 the incoming stream of media to detect next discrete data asset, and so on.

When a user selects 50 a particular audio or video asset for viewing, the host server will now retrieve 110 only a portion of the corresponding transcription text stored in the transcript storage unit, instead of retrieving the full transcript, as described in the embodiment discussed above. A length of the portion of the transcription text that is retrieved from the storage may vary upon the length of the complete data asset. The first portion of the transcription text is then analyzed 120 using one of the techniques described above and at least one advertisement is identified 130 and retrieved from the advertisement storage unit or from the ad server engine. Such advertisement is then displayed in proximity 140 to the data asset until the playback of a portion of the data asset that corresponds to the first portion of the transcription text is completed.

This process is then repeated until the playback of the whole data asset is completed. Specifically, once the user begins to view second portion of the data asset, the corresponding second portion of the transcription text is again retrieved from the transcript storage unit and analyzed, and another advertising contextually relevant to the second portion of data assert is identified and displayed alongside the streaming data asset until the playback of the second portion of data asset is finished.

For example, if a user is viewing a two minute video clip, the user will see several clickable text ads adjacent to the streaming video window. Those text ads will be contextually relevant to the actual dialog or narrative within the video clip and will change at a specified interval of time, such as every thirty seconds. This is accomplished by extracting the corresponding text from a thirty second segment of the video and analyzing that text to identify and retrieve relevant ads for display near the playing video.

In other embodiments of the present invention, contextually relevant advertisements can be also provided during live radio broadcast. For example, if a user is listening to live radio broadcast provided over the Internet, the relevant advertisements may be provided next to the media player window that is streaming the radio broadcast. In such embodiment, a first portion of live radio broadcast is retrieved by the host server and is transcribed using the voice recognition techniques. The transcribed text is then analyzed to identify the advertisement contextually relevant to the first portion of radio broadcast. The steps are repeated until the radio broadcast is stopped. It should be appreciated, however, that in this embodiment the relevant advertisement can only be displayed during a playback of the second portion of radio broadcast because the relevant advertisement cannot be retrieved until the complete first portion of the radio broadcast is received, transcribed and analyzed by the host server. This way, if the user is listening to a radio program through the media player, the advertisement text that is displayed alongside the media player during a certain interval of time will be contextually relevant to a preceding time interval of the radio broadcast.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for serving contextually relevant advertisements, comprising:
    a computer system;
    a software executing on said computer system for continuously monitoring a stream of media to detect a data asset;
    a software executing on said computer system for retrieving said data asset from said stream;
    a software executing on said computer system for transcribing said data asset to produce a transcription text;
    a software executing on said computer system for analyzing said transcription text and retrieving at least one advertisement item contextually relevant to said data asset;
    a software executing on said computer system for forwarding said data asset to a user together with said at least one advertisement item; and
    wherein said at least one advertisement item is displayed simultaneously with and in proximity to said data asset.

2. The system for serving contextually relevant advertisements in accordance with claim 1, wherein said stream of media comprises a stream of media on the Internet.

3. The system for serving contextually relevant advertisements in accordance with claim 1, wherein said data asset is a video file.

4. The system for serving contextually relevant advertisements in accordance with claim 1, wherein said data asset is an audio file.

5. The system for serving contextually relevant advertisements in accordance with claim 1, further comprising a metadata storage unit for storing metadata as-sociated with said data asset.

6. The system for serving contextually relevant advertisements in accordance with claim 5, wherein said stored metadata is retrieved when said data asset is selected by the user.

7. The system for serving contextually relevant advertisements in accordance with claim 6, wherein said metadata is used to select said at least one advertisement item contextually relevant to said data asset.

8. The system for serving contextually relevant advertisements in accordance with claim 1, further comprising an advertisement storage unit for storing advertisement items received from at least one advertisement provider.

9. The system for serving contextually relevant advertisements in accordance with claim 1, further comprising a transcript storage unit for storing said transcription text.

10. The system for serving contextually relevant advertisements in accordance with claim 9, further comprising a software executing on said computer system for retrieving said transcription text from said transcript storage unit when said data asset is selected by a user.

11. The system for serving contextually relevant advertisements in accordance with claim 1, wherein said at least one advertisement item comprises hyper text linked to a corresponding advertisement web page.

12. A method for serving contextually relevant advertisements, comprising the steps of:
    continuously monitoring a stream of media with a computer to detect a data asset;
    retrieving said data asset with a computer from said stream when said data asset is detected;
    transcribing said data asset with a computer to create a transcription text;
    analyzing said transcription text with a computer to identify at least one advertisement item contextually relevant to said data asset; and delivering said data asset to a user with a computer with said at least one advertisement item displayed simultaneously with and in proximity to said data asset.

13. The method for serving contextually relevant advertisements according to claim 12, wherein said data asset is an audio file.

14. The method for serving contextually relevant advertisements according to claim 12, wherein said data asset is a video file.

15. The method for serving contextually relevant advertisements according to claim 12, further comprising a step of storing said transcription text with a computer in a transcript storage unit for later retrieval.

16. The method for serving contextually relevant advertisements according to claim 15, further comprising a step of retrieving said transcription text with a computer from said transcript storage unit when said data asset is selected by a user.

17. The method for serving contextually relevant advertisements according to claim 12, further comprising a step of using a voice recognition technique with a computer to create said transcription text.

18. The method for serving contextually relevant advertisements according to claim 15, wherein said voice recognition technique comprises a step of creating a searchable index with a computer of every word contained in said data asset.

19. The method for serving contextually relevant advertisements according to claim 12, further comprising a step of providing said at least one advertisement item with a computer in form of a hyper text linked to a corresponding advertisement web page.

20. The method for serving contextually relevant advertisements according to claim 12, wherein said stream of media comprises a stream of media on the Internet.

21. A method for serving contextually relevant advertisements, comprising the steps of:
   continuously monitoring a stream of media with a computer on the Internet to detect a data asset;
   retrieving said data asset with a computer from said stream when said data asset is detected;
   transcribing said data asset with a computer to create a transcription text;
   storing said transcription text with a computer in a transcript storage unit for later retrieval;
   retrieving a first portion of said transcription text with a computer having a variable length after a playback of a first corresponding portion of said data asset is initiated by a user;
   analyzing said first portion of said transcription text with a computer to identify at least one advertisement item contextually relevant to said first corresponding portion of said data asset;
   displaying said at least one advertisement item with a computer simultaneously with and in proximity to said data asset until the playback of said first portion of said data asset is completed;
   retrieving a second portion of said transcription text with a computer having said variable length corresponding to a second portion of said data asset being played by the user, analyzing said second portion of said transcription text with a computer, identifying at least one advertisement item with a computer contextually relevant to said second corresponding portion of said data asset, and displaying said at least one advertisement item with a computer simultaneously with and in proximity to said data asset until the playback of said second portion of said data asset is completed; and
   repeating the steps with a computer until the playback of said data asset is completed.

22. The method for serving contextually relevant advertisements according to claim 21, wherein said variable length is thirty seconds.

23. The method for serving contextually relevant advertisements according to claim 21, wherein said variable length is fifteen seconds.

24. The method for serving contextually relevant advertisements according to claim 21, wherein said data asset is an audio file.

25. The method for serving contextually relevant advertisements according to claim 21, wherein said data asset is a video file.

26. The method for serving contextually relevant advertisements according to claim 21, further comprising a step of using a voice recognition technique with a computer to create said transcription text.

27. The method for serving contextually relevant advertisements according to claim 21, wherein said voice recognition technique comprises a step of creating a searchable index with a computer of every word contained in said data asset.

28. The method for serving contextually relevant advertisements according to claim 21, further comprising a step of providing said at least one advertisement item with a computer in form of a hyper text linked to a corresponding advertisement web page.

29. A method for serving contextually relevant advertisements during live radio broadcast, comprising the steps of:
   retrieving a first portion of live radio broadcast with a computer;
   transcribing said first portion of live radio broadcast with a computer to create a first portion of transcription text;
   analyzing said first portion of transcription text with a computer to identify at least one advertisement item contextually relevant to said first portion of live radio broadcast;
   displaying said at least one advertisement item with a computer on a user's computer system simultaneously with said first portion of live radio broadcast and in proximity to a media player through which said live radio broadcast is streamed;
   retrieving a second portion of live radio broadcast with a computer;
   transcribing said second portion of live radio broadcast with a computer to create a second portion of transcription text;
   analyzing said second portion of transcription text with a computer to identify at least one advertisement item contextually relevant to said second portion of live radio broadcast and displaying said item with a computer on a user's computer system simultaneously with said second portion of live radio broadcast and in proximity to a media player through which said live radio broadcast is streamed; and
   repeating the steps with a computer until said live radio broadcast is completed.

30. The method for serving contextually relevant advertisements during live radio broadcast according to claim 29, wherein said at least one contextually relevant advertisement item is delivered to a user with a computer after a playback of a corresponding portion of said live radio broadcast is completed.

* * * * *